United States Patent
Alfano et al.

(10) Patent No.: US 10,496,193 B1
(45) Date of Patent: Dec. 3, 2019

(54) DIGITAL PEN WITH THREE-DIMENSIONAL INPUT INTERFACE

(71) Applicant: Dell Products, L.P., Round Rock, TX (US)

(72) Inventors: Keith M. Alfano, Austin, TX (US); Michiel Sebastiaan Emanuel Petrus Knoppert, Amsterdam (NL); Deeder M. Aurongzeb, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/021,255

(22) Filed: Jun. 28, 2018

(51) Int. Cl.
- *G06F 3/0354* (2013.01)
- *G06F 3/0346* (2013.01)
- *G06F 3/01* (2006.01)
- *G06F 3/0487* (2013.01)
- *G06F 3/044* (2006.01)

(52) U.S. Cl.
CPC ......... *G06F 3/03545* (2013.01); *G06F 3/011* (2013.01); *G06F 3/017* (2013.01); *G06F 3/0346* (2013.01); *G06F 3/03547* (2013.01); *G06F 3/044* (2013.01); *G06F 3/0487* (2013.01); *G06F 2203/04105* (2013.01)

(58) Field of Classification Search
CPC ....... G06F 3/03545; G06F 2203/04105; G06F 3/044–0442
See application file for complete search history.

(56) References Cited

U.S. PATENT DOCUMENTS

| | | | | |
|---|---|---|---|---|
| 2010/0091112 A1* | 4/2010 | Veeser | ................. | G01B 11/002 348/207.1 |
| 2012/0331546 A1* | 12/2012 | Falkenburg | ......... | G06F 3/03545 726/16 |
| 2014/0210758 A1* | 7/2014 | Park | ........................ | G06F 3/016 345/173 |
| 2015/0363035 A1* | 12/2015 | Hinckley | .............. | G06F 3/0383 345/173 |
| 2016/0154484 A1* | 6/2016 | Kampf | ................ | G06F 3/03545 345/179 |
| 2016/0179222 A1* | 6/2016 | Chang | ................. | G06F 3/03545 345/179 |
| 2018/0329526 A1* | 11/2018 | Peretz | ................ | G06F 3/03545 |

* cited by examiner

*Primary Examiner* — Laurence J Lee
(74) *Attorney, Agent, or Firm* — Fogarty LLP

(57) ABSTRACT

A pen device includes a battery, a logic unit and a wireless transceiver configured to transmit detected pen device inputs by a user to an IHS (Information Handling System). A touchpad extending around a circumference of the pen device includes capacitive layers configured to detect the user contacting the touchpad. The touchpad also includes pressure-sensitive layers configured to detect a force applied by the user in contacting the touchpad. The combination of inputs from the layers of the touchpad provides the location and pressure of the user's contact with the touchpad. These touchpad inputs in combination with the detected movement of the pen device support detection of inputs such as taps, squeezes and gestures that may serve as inputs to an application operating on the IHS. Utilizing the pen device in this manner, a user may provide various types of application inputs without interruption from the user's current workflow.

13 Claims, 4 Drawing Sheets

DIGITAL PEN WITH THREE-DIMENSIONAL INPUT INTERFACE

FIELD

This disclosure relates generally to a digital stylus utilized by an Information Handling System (IHS), and more specifically, to IHS inputs by a digital stylus.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Traditionally, input mechanisms for IHSs were limited to keyboards and mice. More recently, IHSs have evolved to include new forms of user inputs, such as touch screens. The use of touch screen inputs has become increasingly common with the proliferation of smart phones, tablets and certain laptop devices. Touch screens may receive inputs from the user in the form of finger gestures or through the use of a stylus. The use of a stylus, such as a pen device, as a touchscreen input mechanism is becoming increasingly common as tablets and touchscreen-enabled laptops have been adopted for more uses. Certain IHSs that support touchscreen inputs may also include a trackpad interface, thus requiring the user to switch between inputs to the trackpad interface and the touchscreen.

Certain IHSs that utilize a touchscreen do not include a trackpad interface. In such scenarios, the touchscreen interface is ill-suited for certain user input tasks, such as tasks requiring fine degrees of human motor dexterity. For instance, selecting small targets, such as cells in a spreadsheet, may be difficult using a touchscreen. In such touchscreen IHSs, more precise selection capabilities may be provided via a digital pen device by which the user may select items on the touchscreen display.

More recently, IHSs may be used to provide users with virtual reality software applications that provide users with immersive, simulated environments. In some virtual reality scenarios, users may interact with virtual objects provided within the simulated environments. Augmented reality software applications and mixed reality software applications similarly provide users with simulated environments that may be projected on the physical surroundings of the user. Certain virtual reality applications support user inputs via peripheral devices such as a trackpads and digital pens. Users may switch between using the trackpad and digital pen in order to utilize the inputs supported by each of these peripheral devices.

A common aspect of providing users with multiple input mechanisms, such as a trackpad and a digital pen, is the disruption to the user's workflow that results from switching between the different available input mechanisms. In order to switch from the use of a digital pen device to a trackpad for inputs to an IHS software application, the user may be required to put the pen device down and switch over to the trackpad. Such a transition typically requires the user to make several hand movements and possibly to divert their gaze away from the current task at hand via the display device.

SUMMARY

In various embodiments, a pen device includes: a battery; a logic unit powered by the battery; a wireless transceiver powered by the battery and configured to transmit detected inputs by a user to an IHS (Information Handling System); and a touchpad extending around a circumference of the pen device, wherein the touchpad comprises one or more capacitive layers configured to detect the user contacting the touchpad, and wherein the touchpad further comprises one or more pressure-sensitive layers configured to detect a force applied by the user in contacting the touchpad.

In various additional pen device embodiments, in response to detecting the user contacting the touchpad, the wireless transceiver signals the IHS to detect the location of a tip of the pen device relative to a display interface of the IHS. In various additional pen device embodiments, the display interface is a touchscreen display. In various additional pen device embodiments, the display interface is a virtual reality display. In various additional pen device embodiments, the one or more pressure-sensitive layers comprise layers of piezoelectric polymers. In various additional embodiments, the pen device further includes an accelerometer configured to detect movement of the pen device. In various additional pen device embodiments, in response to detecting user contact with the touchpad, the wireless transceiver transmits a detected movement of the pen device to the IHS, and wherein the IHS determines whether the detected movement of the pen device corresponds to a gesture that is mapped to an IHS software function. In various additional pen device embodiments, in response to detecting user contact with the touchpad, the logic unit determines if the force applied by the user is above a pre-defined threshold. In various additional pen device embodiments, in response to detecting the force of user contact with the touchpad above the pre-defined threshold, the logic unit determines the duration of the force of user contact above the pre-defined threshold. In various additional pen device embodiments, in response to detecting the force of user contact with the touchpad above the pre-defined threshold for a duration longer than a pre-defined time interval, the wireless transceiver transmits a detected long-duration squeeze of the pen device to the IHS. In various additional pen device embodiments, in response to detecting the force of user contact with the touchpad above the pre-defined threshold for a duration shorter than the pre-defined time interval, the wireless transceiver transmits a detected short-duration squeeze of the pen device to the IHS. In various additional embodiments, the pen device further includes a haptic motor configured to provide vibration feedback to the user in response to receiving a signal from the IHS confirming successful configuration of an IHS software function based on the user inputs received by the IHS.

In various embodiments, a system includes a pen device that includes: a logic unit; a wireless transceiver configured to communicate detected pen device inputs by a user to an IHS (Information Handling System); and a touchpad extending around a circumference of the pen device, wherein the touchpad comprises one or more capacitive layers configured to detect the user contacting the touchpad, and wherein the touchpad further comprises one or more pressure-sensitive layers configured to detect a force applied by the user in contacting the touchpad. The system further includes an IHS configured to: receive the detected user inputs to the pen device communicated by the wireless transceiver; and detect a location of a tip of the pen device relative to a display interface of the IHS in response to a received user input indicating user contact with the touchpad.

In various additional embodiments of the system, in response to receiving a detected movement of the pen device communicated by the wireless transceiver, the IHS configures a first software function. In various additional embodiments of the system, in response to detecting user contact with the touchpad, the logic unit of the pen device determines a duration of the force applied by the user above a pre-defined threshold. In various additional embodiments of the system, in response to detecting the force of user contact with the touchpad above the pre-defined threshold for a duration longer than a pre-defined time interval, the wireless transceiver transmits a detected long-duration squeeze of the pen device to the IHS, and wherein the IHS performs configures a second software function in response to the receipt of the detected long-duration squeeze. In various additional embodiments of the system, in response to detecting the force of user contact with the touchpad above the pre-defined threshold for a duration shorter than the pre-defined time interval, the wireless transceiver transmits a detected short-duration squeeze of the pen device to the IHS, and wherein the IHS configures a third software function in response to the receipt of the detected short-duration squeeze. In various additional embodiments of the system, the IHS confirms successful configuration of the first IHS software function by transmitting a confirmation signal to the pen device, and wherein the pen device comprises a haptic motor configured to provide vibration feedback to the user in response to receiving the confirmation signal.

In various embodiments, a method for supporting the operation of a pen device with a three-dimensional touchpad includes: detecting user inputs to a touchpad extending around a circumference of the pen device, wherein the touchpad comprises one or more capacitive layers configured to detect the user contacting the touchpad, and wherein the touchpad further comprises one or more pressure-sensitive layers configured to detect a force applied by the user in contacting the touchpad; transmitting, via a wireless transceiver of the pen device, the detected user inputs to an IHS (Information Handling System); receiving, by the IHS, the detected user inputs to the pen device communicated by the wireless transceiver; and detecting, by the IHS, a location of a tip of the pen device relative to a display interface of the IHS in response to a received user input indicating user contact with the touchpad.

In various additional embodiments, the method further includes: determining, by a logic unit of the pen device, if the force applied by the user is above a pre-defined threshold for longer than a pre-defined time interval; in response to detecting the force of the user contact with the touchpad above the pre-defined threshold for a duration longer than the pre-defined time interval, transmitting, by the wireless transceiver of the pen device, notification of a detected long-duration squeeze of the pen device to the IHS; configuring, by the IHS, a first software operation in response to the notification of the detected long-duration squeeze; in response to detecting the force of the user contact with the touchpad above the pre-defined threshold for a duration shorter than the pre-defined time interval, transmitting, by the wireless transceiver of the pen device, notification of a detected short-duration squeeze of the pen device to the IHS; and configuring, by the IHS, a second software operation in response to the notification of the detected short-duration squeeze.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 2b is illustration of a magnified portion of the pen device with a three-dimensional touchpad of FIG. 2a.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 1:
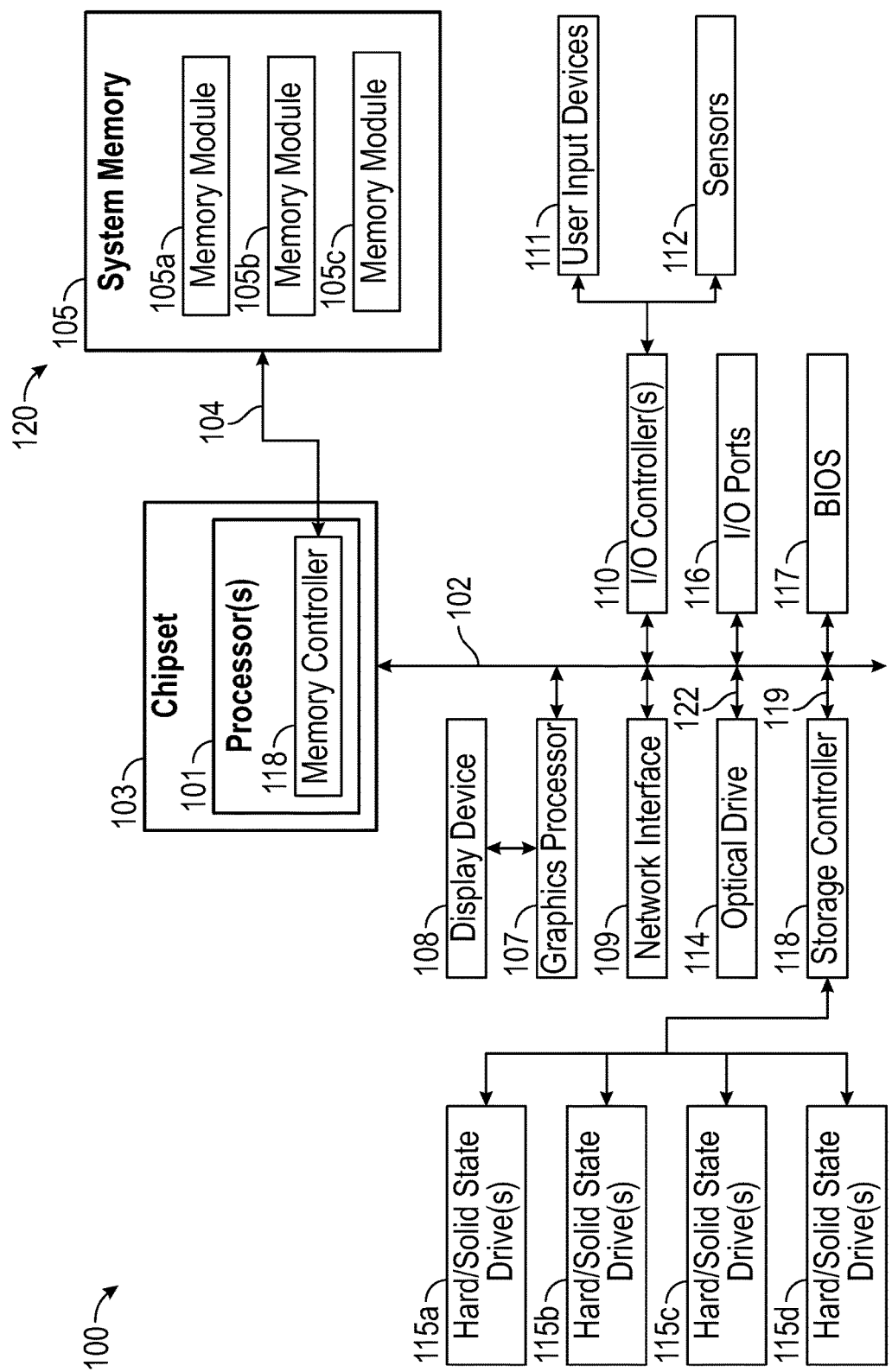
FIG. 1 is a block diagram depicting certain components of an IHS configured according to various embodiments for use with a pen device with a three-dimensional touchpad.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows various internal components of an example IHS configured to implement the provided embodiments. It should be appreciated that although certain embodiments described herein may be discussed in the context of a laptop or tablet computing device with a touch-sensitive display, other embodiments may be utilized with various other types of computing devices.

FIG. 1 is a block diagram of an IHS 100 configured according to various embodiments to utilize a pen device with a three-dimensional touchpad. In various embodiments, IHS 100 may execute program instructions that cause IHS 100 to perform certain of the operations disclosed herein. While a single IHS 100 is illustrated in FIG. 1, IHS 100 may be a component of an enterprise system that may include any number of additional IHSs that may also be configured to utilize a pen device with a three-dimensional touchpad in the same or similar manner to IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory.

In certain embodiments, the system memory 105 may be comprised of multiple removable memory modules. The system memory 105 of the illustrated embodiment includes three removable memory modules 105a, 105b and 105c. Each of the removable memory modules 105a-c may correspond to a motherboard memory socket that receives a removable memory module 105a-c, such as a DIMM (Dual In-line Memory Module), that can be coupled to the socket and then decoupled from the socket as needed, such as to upgrade memory capabilities or to replace faulty components. Other embodiments of IHS 100 may be configured with memory socket interfaces that correspond to different types of removable memory modules, such as a Dual In-line Package (DIP) memory, a Single In-line Pin Package (SIPP) memory, a Single In-line Memory Module (SIMM), and/or a Ball Grid Array (BGA) memory.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may rely on any number of individual buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.) and WIFI. In certain embodiments, the network interface 109 may include a short-range, wireless communication interface, such as BLUETOOTH, configured to interoperate with a pen device with a three-dimensional touchpad, such as described with regard to the following embodiments.

Chipset 103 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102. In certain embodiments, the display device 108 may include a headset capable of providing a user of the IHS 100 with a virtual reality display, an augmented reality display and/or a mixed reality display.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. The user input devices may interface with the I/O controller 110 through wired or wireless connections. Sensors 112 accessed via I/O controllers 110 may provide access to data describing environmental and operating conditions of IHS 100. Other components of IHS 100 may include one or more I/O ports 116 for communicating with peripheral external devices as well as various input and output devices. For instance, I/O 116 ports may include USB (Universal Serial Bus) ports, by which a variety of external devices may be coupled to IHS 100.

As illustrated, IHS 100 also includes a BIOS (Basic Input/Output System) 117 that may be stored in a non-volatile memory accessible by chipset 103 via bus 102. The BIOS 117 provides an abstraction layer that allows the operating system to interface with the hardware components of the IHS 100. Upon powering or restarting IHS 100, processor(s) 101 may utilize BIOS 117 instructions to initialize and test hardware components coupled to the IHS 100, including both components permanently installed as components of the motherboard of IHS 100 and removable components installed within the various expansion slots supported by the IHS 100. The BIOS 117 instructions may also load an operating system for use by the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, IHS 100 includes four storage drives 115*a-d*. In various embodiments, any number of storage drives may be supported and the storage drives 115*a-d* may include SAS (Serial Attached SCSI) magnetic disk drives, SATA (Serial Advanced Technology Attachment) magnetic disk drives, solid-state drives (SSDs) and other types of storage drives in various combinations. Each of the storage drives 115*a-d* may be located within the enclosure of the IHS 100, or alternatively one or more of the storage drives 115*a-d* may instead be external to IHS 100. One or more of the storage drives 115*a-d* may instead be located remotely from IHS 100 and may be configured as network attached storage devices.

In providing storage services, IHS 100 is may utilize a storage controller 118 that provides access to the four storage drives 115*a-d*. In various embodiments, storage controller 118 may be comprised of hardware and software that is configured to provide storage and retrieval of data from the storage drives 115*a-d*. Storage controller 118 may be configured to provide access to the four storage drives 115*a-d* as a single logical storage device as part of a distributed data storage solution. Certain embodiments may utilize additional storage controllers that provide access to additional storage devices.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
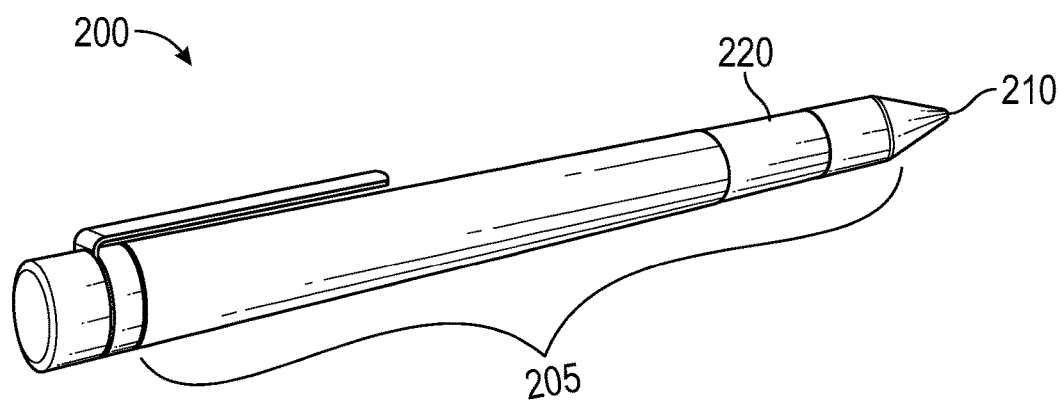
FIG. 2a is an illustration of a pen device with a three-dimensional touchpad according to certain embodiments.

FIG. 2*a* is an illustration of a pen device 200 that includes a three-dimensional touchpad according to various embodiments. In the illustrated embodiment, the three-dimensional touchpad 220 is located below the midpoint of the barrel 205 of the pen device 200 towards the tip 210 of the pen device. Various embodiments may include a three-dimensional touchpad 220 at various locations along the barrel 205 of the pen device 200. The location of the three-dimensional touchpad 220 along the barrel 205 may be selected such that the user's fingers that are used to grasp the pen device 200 may rest on the three-dimensional touchpad 220 when the pen device 200 is used as a writing, drawing or selection instrument by the user. The three-dimensional touchpad 220 may be located along the barrel 205 such that a user may utilize the pen device 200 as a writing instrument while grasping the three-dimensional touchpad 220, or while grasping another portion of the barrel 205 such that the user's fingers do not contact three-dimensional touchpad 220. Accordingly, the pen device 200 may be utilized without the user contacting the three-dimensional touchpad 220.

In scenarios where the user grasps the pen device 200 by the three-dimensional touchpad 220, the user's contact with the three-dimensional touchpad 220 may be captured as user inputs by the pen device 200. As described in additional detail with regard to FIG. 3, the three-dimensional touchpad 220 may capture various user inputs through the detection of the user's fingers contacting the three-dimensional touchpad 220 and the force used by the user in grasping three-dimensional touchpad 220. The pen device 200 may include internal components that capture and process user inputs and that interoperate with an IHS that supports use of the described pen device 200.

In certain embodiments, the pen device 200 may include an internal battery used to power the internal electronics of the pen device 200. The internal battery may be a rechargeable battery that may be charged via one or more charging contacts provided on the surface of the pen device 200. For instance, a pen device 200 may include charging contacts exposed on surface of the barrel 205 such that the internal batteries may be recharged while the pen device 200 is docked within a charging slot of an IHS that supports the pen device. In certain embodiments, the internal components of the pen device 200 may include an inductive coil used for wireless charging of an internal battery housed within the barrel 205 of the pen device. For instance, a charging current may be induced in the inductive coil of the pen device 200 when the pen device is placed in proximity to a corresponding inductive charging coil provided by an IHS, such as in a designated charging area of a keyboard, display device or enclosure of the IHS. The inductive coils utilized within certain of such embodiments may utilize resonant power transfer, in which the inductive coils within the pen device 200 and the IHS operate at identical, resonant frequencies, thus allowing for effective power transfer coupling between the inductive coils at proximities greater than can be supported using traditional inductive coupling. In other embodiments, the internal battery of the pen device 200 may be a conventional, non-rechargeable battery that may be replaced with a new battery by opening the pen device to expose a battery chamber.

A pen device 200 may also include an internal, wireless transceiver that is powered by the internal battery. The wireless transceiver of the pen device 200 may be a short-range wireless transceiver, such as a BLUETOOTH transceiver, that may be configured to communicate with a corresponding transceiver of the IHS that supports the pen device 200. Via the wireless transceiver, the pen device 200 may transmit captured user inputs to the IHS. At the IHS supporting the pen device 200, the received user inputs may be utilized as inputs to various software applications operating on the IHS. In certain embodiments, the wireless transceiver may also receive responsive transmissions from the IHS, which may be used in providing confirmation signals, such as via haptic feedback, to the user.

In certain embodiments, the user inputs received from the pen device 200 may be used by the IHS in conjunction with touchscreen inputs provided via the tip 210 of the pen device 200. For instance, a user holding the pen device 200 may utilize the tip 210 as a stylus for providing user interface selections and hand-written inputs to a touchscreen display of an IHS. When used in this manner, pen device 200 may provide a more precise mechanism for providing inputs to a touchscreen display when compared to a user providing the same inputs using a finger as a stylus. In certain scenarios, the pen device 200 may be utilized similar to a mouse in order to control a cursor provided by the operating system of the IHS. The pen device 200 may thus be utilized as an input mechanism for the operating system of the IHS and/or various software applications supported by the operating system.

In certain embodiments, the user inputs received from the pen device 200 may be used as inputs to a virtual reality software application available through the IHS. For instance, the IHS may support virtual reality software applications that provide a simulated environment that may be displayed to the user via a headset. Such virtual reality applications may support inputs via the pen device 200 where the location of the tip of the pen device within the simulated environment may be tracked via sensors located within the pen device 200 and/or cameras capable of tracking the position, orientation and movement of the pen device 200 by the user. For instance, the IHS may support a virtual reality graphic design software application that allows the pen device 200 to be used as a stylus for user interface selections and/or freehand drawing of a three-dimensional object within the simulated environment. The pen device 200 may similarly be utilized as an input device within augmented reality and/or mixed reality software applications supported by the IHS using a headset display and/or a projection display.

The pen device 200 may also include an internal processor or other logic units, such as microcontrollers, used in processing the user inputs to the pen device 200. For instance, internal processing capabilities of the pen device 200 may receive inputs from the three-dimensional touchpad 220 and may process these inputs in order to determine the specific type of input being provided by the user. For instance, the internal processing capabilities of the pen device 200 may be utilized to evaluate the location of the user's fingers on the three-dimensional touchpad 220 and the amount of force applied by the user's fingers while gripping the three-dimensional touchpad 220. The processing capabilities of the pen device 200 may also utilize sensors such as an accelerometer and/or a gyroscope in order to detect the orientation and movement of pen device 200 by the user.

Figure 2B:
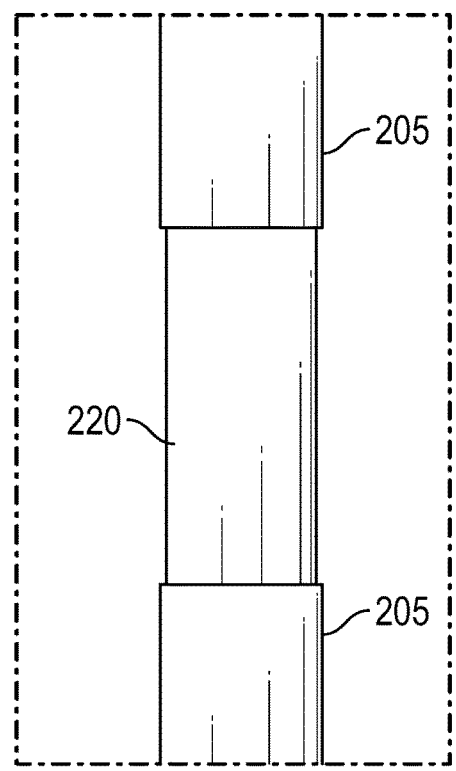

FIG. 2b depicts a magnified portion of the pen device with a three-dimensional touchpad that is illustrated in FIG. 2a. The three-dimensional touchpad 220 extends around the entire circumference of the pen device 200. In certain embodiments, the three-dimensional touchpad 220 may be a sheet that is wrapped around barrel 205 of the pen device 200 within a channel or other similar structural void within a portion of the barrel 205. In other embodiments, the three-dimensional touchpad 220 may be a sleeve that slides over the barrel 205 of the pen device 200 until the sleeve is positioned within a channel of the barrel 205 of the pen device.

Figure 2C:
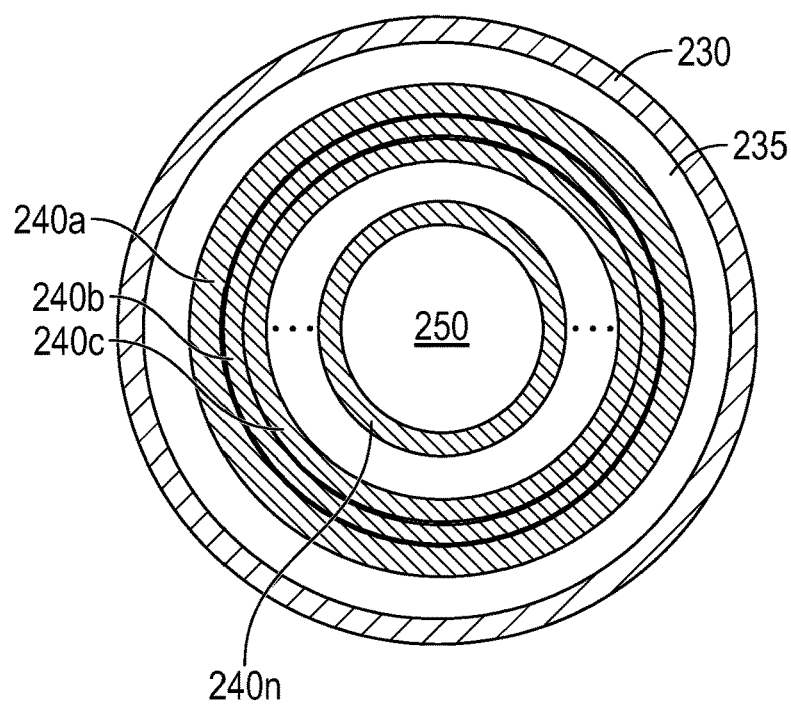
FIG. 2c is a diagram of a cross section of a pen device illustrating layers of a three-dimensional touchpad according to certain embodiments.

FIG. 2c is a diagram of a cross-section of a pen device according to certain embodiments, where the cross-section bisects a portion of the three-dimensional touchpad of the pen device. The cross-section of FIG. 2c illustrates the various layers that may be used to construct the three-dimensional touchpad 205 of FIGS. 2a and 2b. The outer layer 230 of the three-dimensional touchpad may be a protective cover that prevents moisture and oils from the user's fingers from reaching the internal layers that comprise the three-dimensional touchpad. The outer cover 230 may protect the three-dimensional touchpad while not impeding the inner layers from detecting the user touching the three-dimensional touchpad or from detecting the location and force of the user's contact with the three-dimensional touchpad.

As illustrated, a three-dimensional touchpad may include a touch sensor layer 235 below the surface of the outer cover 230. In certain embodiments, touch sensor layer 235 may be constructed from a capacitive material capable of detecting contact by a user, such as detecting contact by the user's fingers. The capacitive material used to construct the touch sensor layer 235 may be a sheet that wraps around the circumference of the pen device below the protective cover 230. In certain embodiments, a microcontroller within the internal electronics of the pen device may be used to apply a voltage to the capacitive sheet forming the touch sensor layer 235. Upon contact by the fingers of a user, a capacitance may be measured at locations along the edges of the capacitive sheet, such as at the four corners of the capacitive sheet. The relative capacitances at each of these measurement locations of the capacitive sheet may be used to determine the position of the user's fingers on the capacitive sheet, thus providing an x-axis and y-axis coordinates of the user's contact with the three-dimensional touchpad.

In certain embodiments, the x-axis and y-axis coordinates of the user's contact with the touch sensor layer 235 may be used to configure certain aspects of the software application. For instance, based on the detection locations of the user's fingers on the touch sensor layer, the pen device or the IHS may determine whether the user is left-handed or right-handed. Based on this determination, various aspects of the software application and its user interface may be modified. For instance, toolbars for left-handed users may be docked on the right-hand side of the display, while toolbars for right-handed users may be docked on the left-hand side of the display.

Below the touch sensor layer 235, the three-dimensional touchpad may be further formed from one or more pressure sensor layers 240a-n. In certain embodiments, each of the pressure sensor layers 240a-n may be constructed from a piezoelectric polymer material capable of generating a voltage in response to mechanical stress, such as the grasp of a user on the three-dimensional touchpad of a pen device. As illustrated, the pressure sensor layers 240a-n may form concentric rings around an inner core of the barrel 250 of the pen device. Configured in this manner, the outermost pressure sensor layer 240a may detect pressure above a threshold required to generate a voltage in that outermost pressure sensor layer.

Additional pressure by the user's fingers may be sufficient to generate a voltage in the next pressure sensor layer 240b, thus detecting an additional amount of pressure applied by the user. Each additional pressure sensor layer may detect additional amounts of pressure by the user on the three-dimensional touchpad. This stack of pressure sensor layers 240a-n thus provides a measurement of the pressure of the user's contact with the three-dimensional touchpad along a z-axis that extends from the outermost pressure sensor layer 240a to the innermost pressure sensor layer 240n. In certain embodiments, a microcontroller within the internal electronics of the pen device may be configured to monitor the individual pressure sensor layers 240a-n and to detect the generation of a voltage in any of these layers due to pressure applied by a user's fingers on that layer.

Figure 3:
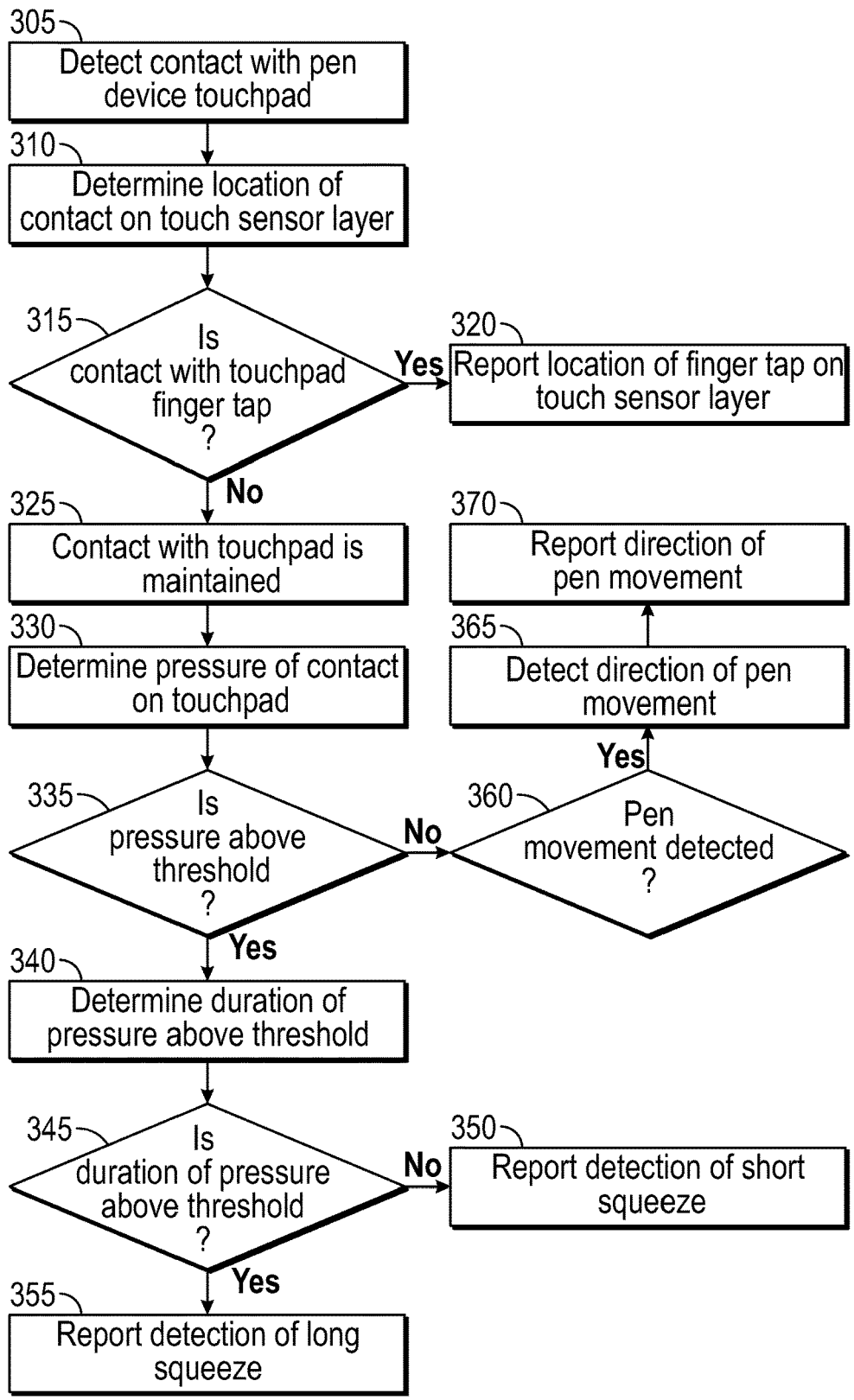
FIG. 3 is a flowchart diagram illustrating certain step of a process according to certain embodiments for the operation of a pen device with a three-dimensional touchpad.

FIG. 3 is a flowchart diagram illustrating certain step of a process according to certain embodiments for the operation of a pen device with a three-dimensional touchpad. As described, a pen device with a three-dimensional touchpad may interoperate with an IHS such that the user inputs captured by the three-dimensional touchpad may be used to control operations of software applications operating on IHS. The process of FIG. 3 for interfacing the pen device with the IHS may begin at step 305 with the detection of user contact with the three-dimensional touchpad. As described with regard to FIG. 2, the three-dimensional touchpad may be constructed using a capacitive touch sensor layer 235 that can detect the user's fingers contacting the three-dimensional touchpad. In such embodiments, a microcontroller or other logic unit associated with the touch sensor layer may detect such contact through capacitance measurements at the edges of the touch sensor layer. In addition, at step 310 the microcontroller may compare the capacitances at each of the measurement points in order to determine the location of the user's fingers on the touch sensor layer, thus providing an x-axis and a y-axis measurement of the user's contact with the three-dimensional touchpad.

At step 315, the internal logic of the pen device may determine whether the user contact detected by the touch sensor layer corresponds to a finger tap on the three-dimensional touchpad by the user. In certain embodiments, a finger tap may be affirmatively detected based on a measured time duration of the user's contact with the touch sensor layer. For instance, the detection of contact with the touch sensor layer by one or more fingers followed by a release of the detected contact within a predetermined time interval may indicate the tap of a finger on the three-dimensional touchpad. If the detected contact with the touch sensor layer indicates a finger tap by the user, at step 320, the detection of a finger tap is transmitted from the pen device to the IHS. In response, the IHS may be configured to determine the location of the tip of the pen device at the time of the detected finger tap on the three-dimensional touchpad. In certain embodiments, multiple time thresholds may be utilized to detect other varieties of finger taps on the three-dimensional touchpad, such as detecting double finger taps, long finger taps and short finger taps.

As described above, in certain embodiments, the pen device may be used to provide inputs to a touchscreen display coupled to the IHS. In such embodiments, the IHS may determine the location of the pen tip contacting the touchscreen display at the time of the detected finger tap. In certain embodiments, a finger tap detected on the three-dimensional touchpad may be processed similarly to a mouse click, thus allowing a user to select display elements and to perform other mouse actions by tapping on the three-dimensional touchpad of the pen device. Also as described, other embodiments may utilize the pen device as an input mechanism within a virtual reality environment. In virtual reality environments, a finger tap detected on the three-dimensional touchpad may be processed as a selection made by a user within the virtual reality environment. In such embodiments, the IHS may be configured to respond to a finger tap by locating the pen tip within the simulated environment that is displayed to the user, such as via a virtual reality headset, in order to make a selection for the user at that pen tip location.

If, at step 315, the contact with the three-dimensional touchpad is sustained such that the user is not tapping touchpad, at step 325, the internal logic of the pen device determines that contact with the touchpad has been maintained. At step 330, the internal logic of the pen device determines the force being applied on the three-dimensional touchpad by the user during this sustained contact with the touchpad. As described with regard to FIG. 2c, the amount of force exerted by the user's grasp on the three-dimensional touchpad may be determined using one or more pressure-sensing layers, such as layers formed from piezoelectric polymers. Based on the number of the concentric pressure-sensing layers of the three-dimensional touchpad that detect a force applied by the user's grasp, the amount of pressure applied by the user may be determined.

At step 335, the internal logic of the pen device determines, based on the number of pressure sensing layers detecting an applied force by the user, whether the force being applied by the user's grasp is above a predetermined threshold. If the detected pressure is not above the predetermined threshold, but contact with the three-dimensional touchpad is maintained, at step 360, the internal logic of the pen device may determine whether the pen device is being moved by the user. In certain embodiments, pen movements may be used to indicate gestures that may be mapped to specific functions within software applications operating on the IHS. For instance, a pen movement that flicks the tip of the pen to the right and returns the pen to its original position may be defined as a gesture. Such a right-flick gesture may be mapped to a software function of the IHS, such as a "cut" operation. In the same manner, a pen movement that flicks the tip of the pen to the left and returns the pen to its original position may be defined as a different gesture, such as a "paste" operation.

Various embodiments may support additional gestures that may be mapped to a variety of different software functions. For instance, a slow flick operation that includes a brief pause before returning the pen device to its original position may be mapped to a scrolling operation, where the duration of the pause indicates the amount of scrolling to be performed in response to the flick. A slow left flick gesture may correspond to scrolling upwards within the document or application currently being utilized, and a slow right flick gesture may correspond to scrolling downwards within the document or application. Other supported gestures may include upward flicks, downward flicks, left-hand loops, right-hand loops, checkmarks, combination flicks (e.g., an upward flick followed immediately by a downward flick), the tracing of certain characters (e.g., tracing the letter 'z') and a variety of additional movements of the pen device. Each of these supported gestures may be mapped to specific software functions, such as zooming, panning, pinch-and-zooming, closing and launching of specific user interfaces, and a variety of additional software functions.

As described with regard to FIG. 2a, a pen device may be configured with an accelerometer or other sensor component that may be used to detect movement of the pen device. In certain embodiments, the internal sensors of the pen device may also be used to detect the direction of the movement and the orientation of the pen device. If, at step 360, movement of the pen device is detected, at step 365, the internal sensors of the pen device are utilized to determine the direction of the pen movement by the user. At step 370, the direction of the pen movement may be reported to the IHS via the wireless transceiver of the pen device. In such embodiments, the IHS may utilize this pen movement information to determine whether the pen movement corresponds to a recognized gesture, such as the described cut and paste operations. In other embodiments, the pen device movement and direction information collected from the sensors may be utilized by the internal logic of the pen device in order to determine whether the movements of the pen device correspond to a recognized gesture. In such embodiments, the recognized gestures may be reported to the IHS at step 370.

Referring back to step 335, in scenarios where the pen device determines that the force applied by the user to the three-dimensional touchpad is a above a predetermined threshold, at step 340, the internal logic of the pen device determines the duration of the applied force by the user above the predetermined force threshold. As described, the amount of force applied by the user to the three-dimensional touchpad may be determined based on the number of pressure-sensitive layers within the three-dimensional touchpad that detect the user's application of force while gripping the pen device at the three-dimensional touchpad. The internal logic of the pen device may include the ability to measure the duration of the force being applied by the user to the three-dimensional touchpad. At step 345, the internal logic of the pen device determines whether the duration of the force being applied by the user is longer than the length of a predefined interval.

If the duration of applied force above the predefined threshold is detected for a period longer than a predefined interval, at step 355, the internal logic of the pen device may determine that such as application of force corresponds to a long squeeze of the three-dimensional touchpad of the pen device. Conversely, at step 350, the internal logic of the pen device may determine the application of force corresponds to a short squeeze of the three-dimensional touchpad if the applied force above the predefined threshold is detected for a period shorter than the predefined interval. Configured in this manner, the pen device supports at least two distinct categories of pressure inputs based on the duration of the pressure being applied. Other embodiments may utilize additional classifications of the durations of applied pressure to the three-dimensional touchpad of the pen device. For instance, in a scenario with three distinct durations of applied pressure, a user of the pen device may be provided with the ability to generate a short squeeze input, a medium squeeze input, and a long squeeze input to the pen device based on the duration of applied pressure by the user.

Upon detecting one of the supported pressure duration inputs to the three-dimensional touchpad, the pen device may transmit the detected user input to the IHS. In various embodiments, each of the distinct durations of applied pressure that are supported may be mapped to a specific function in the software applications operating on the IHS. For instance, in response to the detection of a short squeeze of the three-dimensional touchpad, the IHS may be configured to modify the operation of a graphic design application such that the current brush type of the pen device advances to the next available brush type within a series of available brush types. The user may apply repeated short squeeze inputs to the three-dimensional touchpad in order to continue advancing through the series of available brush types. In response to the detection of a long squeeze of the three-dimensional touchpad, the IHS may be configured to switch the function of the pen device within the graphic design application from a brush painting input to a pointer input, thus allowing use of the pen device to select available user interface options. The user may switch back to the brush painting input by repeating the long squeeze input to the three-dimensional touchpad of the pen device.

Other embodiments may support other similar software operations via detected squeeze inputs to the three-dimensional touchpad of the pen device. For instance, a short squeeze may be mapped to a screenshot operation. A long squeeze may be mapped to cycling through a pallet of selected colors, with each long squeeze selecting the next color in the pallet. Similarly, different squeeze inputs may be used to modify different layers of an image that are active and modifiable via the pen device inputs, such as cycling through the different layers of an architectural floorplan displayed by an IHS. Squeeze inputs may be used in certain embodiments to switch between editing modes of a document, such as toggling the visibility of edits to a document. In certain embodiments, squeeze inputs may be used to increase and decrease zoom levels currently in use. A wide variety of additional software functions may be configured for operation via different squeeze inputs to the three-dimensional touchpad of the pen device.

Other embodiments may combine the described input mechanisms in various forms. For instance, the pen device may be configured to detect the combination of a squeeze input above a predefined force in combination with a specific movement of the pen device, such as a specific type of flick of the pen device. Such combinations of inputs may similarly be mapped to various software functions. For instance, a squeeze input above a predefined pressure level in combination with a slow right flick movement of the pen device may be mapped to a screenshot operation by the operating system of the IHS.

In this manner, the three-dimensional touchpad of the pen device may support software functions not otherwise achievable via a conventional touchpad. For instance, as described, different durations of the squeeze inputs may be used to cycle through available brush types and/or the colors available within a pallet. In addition, the three-dimensional touchpad of the pen device allows the user to modify aspects of the software operation without interruption from the current workflow. For instance, the user may use squeeze inputs or gestures cycle through available brush types and/or colors without relinquishing the pen device, and without the user having to divert their gaze away from the display of the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A pen device comprising:
a battery;
a logic unit powered by the battery;
a wireless transceiver powered by the battery and configured to transmit detected inputs by a user to an IHS (Information Handling System); and
a touchpad extending around a circumference of the pen device, wherein the touchpad comprises one or more capacitive layers configured to detect the user contacting the touchpad, and wherein the touchpad further comprises one or more pressure-sensitive layers configured to detect a force applied by the user in contacting the touchpad, and wherein, in response to detecting user contact with the touchpad, the logic unit determines if the force applied by the user is above a pre-defined threshold, and wherein, in response to detecting the force of user contact with the touchpad above the pre-defined threshold, the logic unit determines the duration of the force of user contact above the pre-defined threshold, and wherein, in response to detecting the force of user contact with the touchpad above the pre-defined threshold for a duration longer than a pre-defined time interval, the wireless transceiver transmits a detected long-duration squeeze of the pen device to the IHS.

2. The pen device of claim 1, wherein, in response to detecting the user contacting the touchpad, the wireless transceiver signals the IHS to detect the location of a tip of the pen device relative to a display interface of the IHS.

3. The pen device of claim 2, wherein the display interface is a touchscreen display.

4. The pen device of claim 2, wherein, the display interface is a virtual reality display.

5. The pen device of claim 1, wherein the one or more pressure-sensitive layers comprise layers of piezoelectric polymers.

6. The pen device of claim 1, further comprising:
an accelerometer configured to detect movement of the pen device.

7. The pen device of claim 6, wherein, in response to detecting user contact with the touchpad, the wireless transceiver transmits a detected movement of the pen device to the IHS, and wherein the IHS determines whether the detected movement of the pen device corresponds to a gesture that is mapped to an IHS software function.

8. The pen device of claim 1, wherein, in response to detecting the force of user contact with the touchpad above the pre-defined threshold for a duration shorter than the pre-defined time interval, the wireless transceiver transmits a detected short-duration squeeze of the pen device to the IHS.

9. The pen device of claim 1, further comprising:
a haptic motor configured to provide vibration feedback to the user in response to receiving a signal from the IHS confirming successful configuration of an IHS software function based on the user inputs received by the IHS.

10. A system comprising:
a pen device comprising:
a logic unit;
a wireless transceiver configured to communicate detected pen device inputs by a user to an IHS (Information Handling System), wherein, in response to receiving a detected movement of the pen device communicated by the wireless transceiver, the IHS configures a first software function; and
a touchpad extending around a circumference of the pen device, wherein the touchpad comprises one or more capacitive layers configured to detect the user contacting the touchpad, and wherein the touchpad further comprises one or more pressure-sensitive layers configured to detect a force applied by the user in contacting the touchpad, and wherein, in response to detecting user contact with the touchpad, the logic unit of the pen device determines a duration of the force applied by the user above a pre-defined threshold, and wherein, in response to detecting the force of user contact with the touchpad above the pre-defined threshold for a duration longer than a pre-defined time interval, the wireless transceiver transmits a detected long-duration squeeze of the pen device to the IHS; and
the IHS configured to: receive the detected user inputs to the pen device communicated by the wireless transceiver; and detect a location of a tip of the pen device relative to a display interface of the IHS in response to a received user input indicating user contact with the touchpad, and to configure a second software function in response to the receipt of the detected long-duration squeeze.

11. The system of claim 10, wherein the IHS confirms successful configuration of the first IHS software function by transmitting a confirmation signal to the pen device, and wherein the pen device comprises a haptic motor configured to provide vibration feedback to the user in response to receiving the confirmation signal.

12. The system of claim 10, wherein, in response to detecting the force of user contact with the touchpad above the pre-defined threshold for a duration shorter than the pre-defined time interval, the wireless transceiver transmits a detected short-duration squeeze of the pen device to the IHS, and wherein the IHS configures a third software function in response to the receipt of the detected short-duration squeeze.

13. A method for supporting the operation of a pen device with a three-dimensional touchpad, the method comprising:
detecting user inputs to a touchpad extending around a circumference of the pen device, wherein the touchpad comprises one or more capacitive layers configured to detect the user contacting the touchpad, and wherein the touchpad further comprises one or more pressure-sensitive layers configured to detect a force applied by the user in contacting the touchpad;
determining, by a logic unit of the pen device, if the force applied by the user is above a pre-defined threshold for longer than a pre-defined time interval;
in response to detecting the force of the user contact with the touchpad above the pre-defined threshold for a duration longer than the pre-defined time interval, transmitting, by the wireless transceiver of the pen device, notification of a detected long-duration squeeze of the pen device to the IHS;

configuring, by the IHS, a first software operation in response to the notification of the detected long-duration squeeze;

in response to detecting the force of the user contact with the touchpad above the pre-defined threshold for a duration shorter than the pre-defined time interval, transmitting, by the wireless transceiver of the pen device, notification of a detected short-duration squeeze of the pen device to the IHS; and configuring, by the IHS, a second software operation in response to the notification of the detected short-duration squeeze transmitting, via a wireless transceiver of the pen device, the detected user inputs to an IHS (Information Handling System);

receiving, by the IHS, the detected user inputs to the pen device communicated by the wireless transceiver; and detecting, by the IHS, a location of a tip of the pen device relative to a display interface of the IHS in response to a received user input indicating user contact with the touchpad.

* * * * *